US011332103B2

(12) United States Patent
Öztürk (10) Patent No.: US 11,332,103 B2
(45) Date of Patent: May 17, 2022

(54) BRAKING DEVICE AND METHOD

(71) Applicant: Erke Erke Arastirmalari Ve Mühendislik A.S., Istanbul (TR)

(72) Inventor: Mustafa Naci Öztürk, Istanbul (TR)

(73) Assignee: ERKE ERKE ARASTIRMALARI VE MÜHENDISLIK A.S., Istanbul (TR)

( * ) Notice: Subject to any disclaimer, the term of this patent is extended or adjusted under 35 U.S.C. 154(b) by 251 days.

(21) Appl. No.: 16/625,561

(22) PCT Filed: Jun. 21, 2017

(86) PCT No.: PCT/EP2017/065297
§ 371 (c)(1),
(2) Date: Dec. 20, 2019

(87) PCT Pub. No.: WO2018/233827
PCT Pub. Date: Dec. 27, 2018

(65) Prior Publication Data
US 2021/0362693 A1   Nov. 25, 2021

(51) Int. Cl.
*B60T 1/06* (2006.01)
*B60T 1/10* (2006.01)
*B60T 13/06* (2006.01)
*F16D 61/00* (2006.01)
*F16D 63/00* (2006.01)
*F03G 3/08* (2006.01)

(52) U.S. Cl.
CPC ............... *B60T 1/062* (2013.01); *B60T 1/10* (2013.01); *B60T 13/06* (2013.01); *F03G 3/08* (2013.01); *F16D 61/00* (2013.01); *F16D 63/00* (2013.01); *B60Y 2400/81* (2013.01)

(58) Field of Classification Search
CPC . B60T 1/062; B60T 1/065; B60T 1/10; B60T 13/06; F03G 3/08; F03G 3/083; F16D 61/00; F16D 63/00; Y10T 74/1218
See application file for complete search history.

(56) References Cited

U.S. PATENT DOCUMENTS

| 1,259,293 | A  | * | 3/1918 | Riley .................. B60B 17/0013 105/96 |
| 6,729,580 | B2 | * | 5/2004 | Shultz ..................... B64C 17/06 244/79 |
| 9,140,341 | B2 | * | 9/2015 | Ozturk .................... F16H 33/10 |

FOREIGN PATENT DOCUMENTS

WO   WO-2009022017 A2 *  2/2009   ................ B60T 1/10

\* cited by examiner

*Primary Examiner* — Thomas J Williams
(74) *Attorney, Agent, or Firm* — Schroeder Law PC (57) ABSTRACT

A braking device and method utilizing gyroscopic braking to provide an improved braking device and method for obtaining desired amount of continuous braking power without directly converting kinetic energy into thermal energy which helps in reducing global warming and environmental pollution.

38 Claims, 8 Drawing Sheets

BRAKING DEVICE AND METHOD

The present invention relates to a braking device and method, and particularly but not exclusively relates to a gyroscopic braking device and method.

Braking systems are fundamental components of vehicles which are used to reduce the speed of a vehicle or preventing unwanted acceleration of the vehicle, e.g. during traveling downhill. In conventional braking systems, brake pads or shoes are pressed against a rotating disc or drum that is coupled to a wheel of the vehicle. This causes frictional forces to occur on the surface of the corresponding disc or drum. By means of these frictional forces, the kinetic energy of the vehicle is converted into thermal energy and hence reducing the total kinetic energy of the vehicle. Although these conventional braking systems are widely used in vehicles, they have several disadvantages. In particular, the brake pads or shoes wear out as these braking systems are used, and hence they should regularly be replaced. Also as the braking pads and shoes wear out, they release particles of dust in the ambient air causing pollution and possible health problems for individuals. Furthermore, the amount of thermal energy generated in these systems that cannot be dissipated as heat causes the temperature of the friction surfaces to rise rapidly. As the temperature rises above a threshold value, the performance of the braking system reduces drastically. This issue is also known as brake fade.

Overheating of components of braking systems during continuous use is a potential problem for the braking systems that convert kinetic energy into thermal energy. In order to address this problem to a degree, some aerodynamic techniques such as venting the disc in a disc brake or incorporating cooling fins onto the drum in a drum brake can be used to increase the cooling rate of the braking systems. Alternatively, or additionally, for applicable systems, an additional cooling system can be provided in order to remove the produced thermal energy from the components of the braking system. This requires increasing the capacity of the cooling system of a vehicle or installing a separate cooling system specifically for the braking system. However, both approaches cause an increase in the cost of the vehicle and also in the weight of the vehicle which can adversely affect the performance of the vehicle. Furthermore, the amount of continuous braking power that can be obtained from these braking systems is limited by the amount of thermal energy that can removed from the braking system, and hence limited by air cooling capacity and/or the capacity of the external cooling system used.

In order to reduce the amount of thermal energy generated, regenerative braking systems can be used. For example, in electrical regenerative systems, some of the kinetic energy of the vehicle is converted into electrical energy by using electric generators or motors, and the obtained energy is stored in batteries or capacitors. However, these systems are complex and they require installation of electric generators/motors, and batteries/capacitors to the vehicle which increase both the cost and the weight of the vehicle. In mechanical regenerative braking systems with a flywheel, on the other hand, the kinetic energy of the vehicle is directly stored in the flywheel. However, the flywheels used in such systems are large and heavy which can adversely affect the dynamics of the vehicle. Also, independent of the type of the regenerative braking system used, the amount of energy that can be stored is limited by the capacity of the energy storage medium, e.g. the capacity of the batteries/capacitors and the maximum safe rotational speed of the flywheel. Therefore, they are not considered as suitable for continuous use.

The present invention therefore seeks to address these issues.

Accordingly, it is an object of the present invention to provide an improved braking device and method for obtaining desired amount of continuous braking power without directly converting kinetic energy into thermal energy which helps reducing global warming and environmental pollution.

It is another object of the present invention to provide an improved braking device and method for providing desired amount of constant and continuous braking power.

It is another object of the present invention to provide an improved braking device and method for producing less vibrating braking systems.

It is another object of the present invention to provide an improved braking device and method for producing inexpensive, durable and safe braking systems.

It is another object of the present invention to provide an improved braking device and method for producing lightweight braking systems.

These objects are solved by a braking device according to the present invention and a braking method according to the present invention.

Thus, in accordance with a first aspect of the present invention there is provided a braking device comprising: a body; inner supporting means for supporting the body for rotation about a first axis; outer supporting means for supporting the inner supporting means for rotation about a second axis, wherein the first axis is oriented with respect to the second axis at an alpha angle which is greater than 0 degrees; means for rotating the body about the first axis; means for connecting a rotation that is desired to be braked about a fourth axis to the body so as to transmit rotation and torque to the body about the second axis, wherein the second axis is oriented with respect to the fourth axis at a beta angle which is greater than 0 degrees and less than 90 degrees; suspension means for supporting the outer supporting means, wherein the suspension means is so configured as to allow rotation of the second axis about the fourth axis, and the suspension means is so configured as to prevent rotation of the outer supporting means about the second axis; whereby the body is further allowed to rotate about a third axis which is the precession axis about which the precession of the body occurs as a result of rotating the body about the first axis and applying torque to the body about the second axis, the rotation of the body about the first axis and the torque applied to the body about the second axis together cause the body to further rotate about the third axis, the body rotates about the first axis, the second axis and the third axis simultaneously, the rotation of the body about the first axis and the rotation of the body about the third axis together cause a braking torque to occur about the second axis; thereby to obtain braking torque against the rotation that is desired to be braked about the fourth axis.

One aspect of the invention is that the rotation of the body about the second axis and the rotation of the body about the third axis are observed as if the body rotates about the fourth axis, the rotation of the body about the first axis and the rotation of the body about the third axis together cause a braking torque to occur about the second axis; thereby braking torque against the rotation that is desired to be braked about the fourth axis is obtained.

In another aspect of the invention, the braking device may comprise a first axis, a second axis, a third axis and a fourth axis.

The braking device may provide a continuous, preferably constant, braking torque against the rotation that is desired to be braked about the fourth axis.

In the braking device, if the first axis and the second axis intersect, then the alpha angle is defined as the acute angle (or the right angle if the first axis and the second axis are perpendicular) between the first and second axes. If the first axis and the second axis do not intersect, the alpha angle is defined as the acute or the right angle between the first and second axes when viewed along the direction of the shortest line joining the first and second axes. An alternative way of expressing this geometric relationship is to consider a point on the first axis and to consider an imaginary line which passes through this point and which is parallel to the second axis. The alpha angle is then defined as the acute or the right angle at which the first axis intersects this imaginary line. If the first and the second axes are parallel or coincident, then the alpha angle is 0 degrees. If the first and the second axes are perpendicular, then the alpha angle is 90 degrees. Therefore, the minimum value of the alpha angle is 0 degrees and the maximum value of the alpha angle is 90 degrees.

In the braking device, if the second axis and the fourth axis intersect, then the beta angle is defined as the acute angle (or the right angle if the second axis and the fourth axis are perpendicular) between the second and fourth axes. If the second axis and the fourth axis do not intersect, the beta angle is defined as the acute or the right angle between the second and fourth axes when viewed along the direction of the shortest line joining the second and fourth axes. An alternative way of expressing this geometric relationship is to consider a point on the second axis and to consider an imaginary line which passes through this point and which is parallel to the fourth axis. The beta angle is then defined as the acute or the right angle at which the second axis intersects this imaginary line. If the second and the fourth axes are parallel or coincident, then the beta angle is 0 degrees. If the second and the fourth axes are perpendicular, then the beta angle is 90 degrees. Therefore, the minimum value of the beta angle is 0 degrees and the maximum value of the beta angle is 90 degrees.

In order to obtain braking torque in the braking device, the alpha angle should be greater than 0 degrees, and the beta angle should be greater than 0 degrees and less than 90 degrees.

The value of the alpha angle affects the magnitude of the braking torque. While keeping the other parameters fixed, if the alpha angle is set to 0 degrees then the magnitude of the braking torque becomes 0, that is, the braking torque does not exist. The magnitude of the braking torque increases as the alpha angle increases. The magnitude of the braking torque is maximum if the alpha angle is set to 90 degrees. Thus, the alpha angle may be 90 degrees.

While keeping the other parameters fixed, if the beta angle is set to 0 degrees or 90 degrees then the magnitude of the braking torque becomes 0, that is, the braking torque does not exist.

The inventor of the present invention has found that even small beta angle values may enable the braking device to provide the desired amount of braking torque.

The inner supporting means may comprise any support structure which is so configured as to support the body while allowing the body to rotate about the first axis.

The outer supporting means may comprise any support structure which is so configured as to support inner supporting means while allowing the inner supporting means to rotate about the second axis.

In one embodiment, the inner supporting means may comprise an inner cradle and the outer supporting means may comprise an outer cradle. The body may be mounted for rotation about the first axis to the inner cradle, and the inner cradle may be mounted for rotation about the second axis to the outer cradle. The outer cradle may comprise two support parts each of which is configured to support one end of the inner cradle for rotation about the second axis.

The braking device may comprise a frame wherein the suspension means may be placed between the frame and the outer cradle so as to support the outer cradle such that rotation of the second axis about the fourth axis is allowed, and rotation of the outer supporting means about the second axis is prevented. The frame may be any support structure that the suspension means can be mounted to, thus the frame may also comprise a platform or a chassis of a vehicle.

It is a principle aspect of the braking method that in the braking device, the second axis is allowed to rotate about the fourth axis independently of rotation of the body about the second axis, and the body is allowed to rotate about the second axis independently of rotation of the second axis about the fourth axis. This means that if the body is initially stationary, then rotation of the second axis about the fourth axis should not cause rotation of the body about the second axis with respect to the frame of the braking device, that is, with respect to a reference frame attached to the frame of the braking device, and rotation of the body about the second axis with respect to the frame of the braking device should not cause rotation of the second axis about the fourth axis. This also additionally means that if the body is initially stationary, then rotation of the second axis about the fourth axis should not cause rotation of the body about the fourth axis, and rotation of the body about the second axis should not cause rotation of the body about the fourth axis.

The braking device should satisfy the following two features: (i) if the body is initially stationary, then rotation of the means for connecting a rotation that is desired to be braked about the fourth axis to the body so as to transmit rotation and torque to the body about the second axis causes the body to rotate only about the second axis, that is, it does neither cause the body to rotate about the fourth axis, nor cause the second axis to rotate about the fourth axis; and (ii) the second axis is allowed to rotate about the fourth axis (note that this may also be a limited rotation) even if the means for connecting a rotation that is desired to be braked about the fourth axis to the body so as to transmit rotation and torque to the body about the second axis is kept stationary.

The body may have a limited freedom of rotation about the third axis. For instance, if the body has a freedom of rotation about an axis x which makes an acute angle (which is less than 90 degrees) with the third axis (in other words, if a vector along the axis x has a component on the third axis), then the body has a limited freedom of rotation about the third axis which means that the body is allowed to rotate about the third axis.

The braking device may comprise fluid bearing means so as to support one or more of: the body, the inner supporting means, and means for connecting a rotation that is desired to be braked about a fourth axis to the body so as to transmit rotation and torque to the body about the second axis.

The suspension means may comprise any suspension system wherein the suspension system is so configured as to (i) support the outer supporting means, (ii) allow rotation of the second axis about the fourth axis, and (iii) prevent rotation of the outer supporting means about the second axis.

The suspension means may comprise elastic mounting means. Thus, the outer supporting means may be mounted to the frame by means of elastic mounting means. The elastic mounting means may comprise one or more elastic mounts of any type. The elastic mounting means may comprise one or more engine mounts, preferably three or more engine mounts. Engine mounts may also be referred as motor mounts.

The suspension means may comprise spring means. Thus, the outer supporting means may be mounted to the frame by means of spring means. The spring means may comprise one or more springs of any type. The spring means may comprise one or more mechanical springs.

The spring means may comprise air spring means. The air spring means may comprise one or more pneumatic cylinders which are configured to act as springs by means of compression of air inside the cylinders. The pneumatic cylinders may be single acting or double acting cylinders. The air spring means may comprise one or more air bellows. Air bellows may also be referred as air springs.

The suspension means may be so arranged and/or configured as to allow rotation of the second axis about the fourth axis such that the beta angle is limited at a desired value which is greater than 0 degrees and less than 90 degrees. The stiffness of the suspension means may be at most in the order that allows the second axis to rotate about the fourth axis such that the beta angle is limited at a desired value which is greater than 0 degrees and less than 90 degrees.

The position of a pneumatic cylinder may be defined as the stroke length of the piston of the pneumatic cylinder. The position of an air bellows may be defined as the height of the air bellows. The braking device may comprise means for measuring the position of the air spring means. The means for measuring the position of the air spring means may comprise one or more sensors for measuring the positions of the one or more of the pneumatic cylinders and air bellows. The means for measuring the position of the air spring means may comprise one or more sensors for measuring the pressure values of the air inside the one or more of the pneumatic cylinders and air bellows.

The braking device may comprise means for controlling the position of the air spring means. The means for controlling the position of the air spring means may comprise means for supplying air to the air spring means. The means for controlling the position of the air spring means may comprise means for discharging air from the air spring means. The means for controlling the position of the air spring means may supply air to or discharge air from the air spring means based on the position feedback obtained from the air spring means so as to keep the position of the air spring means within a desired range.

The means for controlling the position of the air spring means may control the volume and/or pressure of the air inside the air spring means.

The means for controlling the position of the air spring means may comprise a control unit.

The means for controlling the position of the air spring means may comprise one or more air compressors and pressurised air tanks, one or more pneumatic tubes and pipes for conveying pressurised air to the pneumatic cylinders or air bellows, and one or more inlet valves and one or more outlet valves for each pneumatic cylinder or air bellows.

The means for controlling the position of the air spring means may be so configured as to keep the centre of mass of the body on the fourth axis.

Instead of air, any other type of gas such as nitrogen and helium may also be used in the air spring means.

Damping the motion of the outer supporting means causes some of the kinetic energy of the rotation that is desired to be braked about the fourth axis to be converted to heat. Therefore, in order to minimise the amount heat dissipated, the suspension means may preferably be so configured as to keep the damping ratio of the suspension means as small as possible.

While the braking device is operating, the body may further rotate in the direction of increasing the beta angle. In order to prevent this rotation, the braking device may comprise means for limiting motion of the second axis such that the beta angle is limited at a desired value which is greater than 0 degrees and less than 90 degrees. The means for limiting motion of the second axis may comprise a mechanical abutment. The mechanical abutment may be mounted for rotation to the frame about the fourth axis. The suspension means may additionally be configured to function as the means for limiting motion of the second axis. For this purpose, the stiffness of the suspension means may be adjusted such that the beta angle is limited at a desired value which is greater than 0 degrees and less than 90 degrees.

The means for connecting a rotation that is desired to be braked about the fourth axis to the body so as to transmit rotation and torque to the body about the second axis may be mounted for rotation about the fourth axis, the means for connecting a rotation that is desired to be braked about the fourth axis to the body so as to transmit rotation and torque to the body about the second axis may be engaged to the rotation that is desired to be braked about the fourth axis, and the means for connecting a rotation that is desired to be braked about the fourth axis to the body so as to transmit rotation and torque to the body about the second axis may be so structured as to apply torque to the body about the second axis when rotated about the fourth axis.

The means for connecting a rotation that is desired to be braked about the fourth axis to the body so as to transmit rotation and torque to the body about the second axis may comprise rotary connection means, the rotary connection means may be mounted for rotation about the fourth axis, the rotary connection means may be engaged to the rotation that is desired to be braked about the fourth axis, and the rotary connection means may be so structured as to apply torque to the body about the second axis when the rotary connection means is rotated about the fourth axis.

The rotary connection means may be so structured as to apply torque to the inner supporting means about the second axis through contact when the rotary connection means is rotated about the fourth axis. In other words, the rotary connection means may be so structured as to apply torque to the body about the second axis through the inner supporting means wherein the rotary connection means is in contact with the inner supporting means.

The rotary connection means may additionally be configured to function as the means for limiting motion of the second axis.

The magnitude of the braking torque can be adjusted by adjusting the speed of the rotation of the body about the second axis. While keeping the other parameters fixed, if the speed of the rotation of the body about the second axis is increased then the magnitude of the braking torque also increases. If the speed of the rotation of the body about the second axis is decreased then the magnitude of the braking torque also decreases.

The braking device may comprise means for controlling the ratio of the speed of the rotation that is desired to be braked to the speed of the rotation of the body about the second axis.

The means for controlling the ratio of the speed of the rotation that is desired to be braked to the speed of the rotation of the body about the second axis may comprise transmission means such that the rotation that is desired to be braked may be engaged to the input shaft of the transmission means, and the means for connecting a rotation that is desired to be braked about the fourth axis to the body so as to transmit rotation and torque to the body about the second axis may be engaged to the output shaft of the transmission means.

The means for rotating the body about the first axis may comprise one or more of: an electrical motor; a hydraulic motor; and a pneumatic motor.

The body may also be rotated about the first axis by means of pressurised fluid. For this purpose, the body may comprise one or more blades. The means for rotating the body about the first axis may comprise means for pumping fluid, and means for projecting fluid onto the blades of the body so as to rotate the body about the first axis. Alternatively, or additionally, the body may comprise one or more fluid pipes. Alternatively, or additionally, the body may comprise one or more fluid channels inside the body. The means for rotating the body about the first axis may comprise means for pumping fluid into one or more fluid pipes or channels of the body such that as the fluid exits from nozzles of the pipes or channels, the body is rotated about the first axis as a result of the reaction of the fluid.

The power required for the means for rotating the body about the first axis may be provided by the rotation that is desired to be braked. For this purpose, an electricity generator and/or a fluid pump which is engaged to the rotation that is desired to be braked may be provided.

The magnitude of the braking torque can be adjusted by adjusting the speed of the rotation of the body about the first axis. When the speed of the rotation of the body about the first axis is increased, the magnitude of the braking torque also increases. When the speed of the rotation of the body about the first axis is decreased, the magnitude of the braking torque also decreases. The speed of the rotation of the body about the first axis can be adjusted by controlling the means for rotating the body about the first axis.

The braking device may comprise means for controlling the means for rotating the body about the first axis so as to control the speed of the rotation of the body about the first axis.

The braking device may comprise one or more sensors for measuring values of one or more of the following parameters: the speed of the rotation of the body about the first axis; the speed of the rotation of the means for connecting a rotation that is desired to be braked about the fourth axis to the body so as to transmit rotation and torque to the body about the second axis; the beta angle; the magnitude of the braking torque; the speed of the rotation that is desired to be braked. The braking device may comprise one of more of the following sensors: hall-effect sensors, optical sensors, proximity sensors, flow sensors and torque sensors.

The braking device may comprise means for controlling the magnitude of the braking torque wherein the means for controlling the magnitude of the braking torque may control the magnitude of the braking torque by controlling one or more of: the speed of the rotation of the body about the first axis; and the ratio of the speed of the rotation that is desired to be braked to the speed of the rotation of the body about the second axis.

The alpha angle may be set to 90 degrees.

The centre of mass of the body may be on the fourth axis. The first axis, the second axis, the third axis and the fourth axis may intersect at the centre of mass of the body. Each of the first axis, the second axis and the third axis may be perpendicular to the other two axes.

The body may be made from a material with a modulus of elasticity exceeding 70 GPa, for example rigid alloy or steel. The body may be cylindrically symmetric. The moment of inertia of the body about the first axis per unit mass may be higher than or equal to $(2/5)*R^2$ where R is radius of the minimal bounding sphere of the body, that is, the smallest sphere containing the body. The body may comprise a hub, a web and a ring-shaped rim.

With such a braking device, it is possible that undesirable vibrations could arise from unbalanced internal forces within the braking device. This problem can be solved by mounting the frame of the braking device to a platform or chassis of a vehicle using suitable engine/motor mounts. Alternatively, or additionally, the braking device may comprise one or more counterbalance masses mounted for rotation about the fourth axis. A further option, which could be used either on its own or in conjunction with one or both of the above solutions, would be to provide a plurality of such braking devices which are mounted together so as to balance the internal forces.

Thus, the present invention may extend to an assembly of two or more braking devices of the above type, in combination with means for distributing the rotation that is desired to be braked to each braking device so as to rotate each of the means for connecting a rotation that is desired to be braked about the fourth axis to the body so as to transmit rotation and torque to the body about the second axis at the same rotational speed but at different respective phase angles wherein the magnitudes of the unbalanced forces in the assembly are reduced whereby the vibrations occurred in the assembly are reduced and the magnitude of the braking torque provided by the assembly is the sum of the braking torques provided by each of the braking devices in the assembly.

The braking device can be used for braking any rotation without directly converting kinetic energy into thermal energy. The braking device does not dissipate heat during braking process other than the heat dissipated as a result of the frictional forces.

In accordance with a second aspect of the present invention there is provided a method of generating braking torque in a braking device comprising: a body; inner supporting means for supporting the body for rotation about a first axis; outer supporting means for supporting the inner supporting means for rotation about a second axis, wherein the first axis is oriented with respect to the second axis at an alpha angle which is greater than 0 degrees; means for rotating the body about the first axis; means for connecting a rotation that is desired to be braked about a fourth axis to the body so as to transmit rotation and torque to the body about the second axis, wherein the second axis is oriented with respect to the fourth axis at a beta angle which is greater than 0 degrees and less than 90 degrees; suspension means for supporting the outer supporting means; the method comprising: a step of configuring the suspension means so as to allow rotation of the second axis about the fourth axis; a step of configuring the suspension means so as to prevent rotation of the outer supporting means about the second axis; whereby the body is further allowed to rotate about a third axis which is the precession axis about which the precession of the body occurs as a result of rotating the body about the first axis and applying torque to the body about the second axis, the rotation of the body about the first axis and the torque applied to the body about the second axis together cause the body to further rotate about the third axis, the body rotates about the first axis, the second axis and the third axis simultaneously, however, the rotation of the body about the second axis and the rotation of the body about the third axis are observed as if the body rotates about the fourth axis, the rotation of the body about the first axis and the rotation of the body about the third axis together cause a braking torque to occur about the second axis; thereby to obtain braking torque against the rotation that is desired to be braked about the fourth axis.

The method may comprise a step of adjusting the magnitude of the braking torque.

The step of adjusting the magnitude of the braking torque may comprise adjusting one or more of: the speed of the rotation of the body about the first axis; and the ratio of the speed of the rotation that is desired to be braked to the speed of the rotation of the body about the second axis.

The method may comprise a step of removing the braking torque when the braking torque is not needed.

The step of removing the braking torque may comprise stopping the rotation of the body about the first axis.

The step of removing the braking torque may comprise disconnecting the rotation that is desired to be braked about the fourth axis from the body.

The step of removing the braking torque may comprise adjusting the alpha angle and/or the beta angle to 0 degrees.

In the method, a continuous, preferably constant, braking torque may be provided against the rotation that is desired to be braked about the fourth axis.

The method may comprise a step of measuring the position of the suspension means.

The method may comprise a step of controlling the position of the suspension means so as to keep the centre of mass of the body on the fourth axis.

The method may comprise a step of controlling the position of the suspension means so as to limit motion of the second axis such that the beta angle is limited at a desired value which is greater than 0 degrees and less than 90 degrees.

The method may comprise a step of setting the alpha angle to 90 degrees.

The main device and method claims are structured in a preamble and a characterising part. This structure is for a better understanding of the subject-matter of the claims. The distribution of the features into the preamble and the characterising part does not mean that all features of the preamble are known and all the features of the characterising part are novel, or vice versa. The value of the features of the claims is independent of whether they are in preamble or in the characterising part.

The purpose of reference signs in the claims is to make the claims easier for all to understand. They do not limit the scope of the claims but they do affect their clarity and may enable them to be expressed more concisely than would otherwise be possible.

These as well as further features, aspects, and advantages of the invention will be better appreciated by reading the following detailed description of presently preferred exemplary embodiments taken in conjunction with accompanying drawings of which.

The present invention is not limited to the presently preferred exemplary embodiments described below, and appropriate modifications can be made without changing the gist of the invention.

Figure 1:
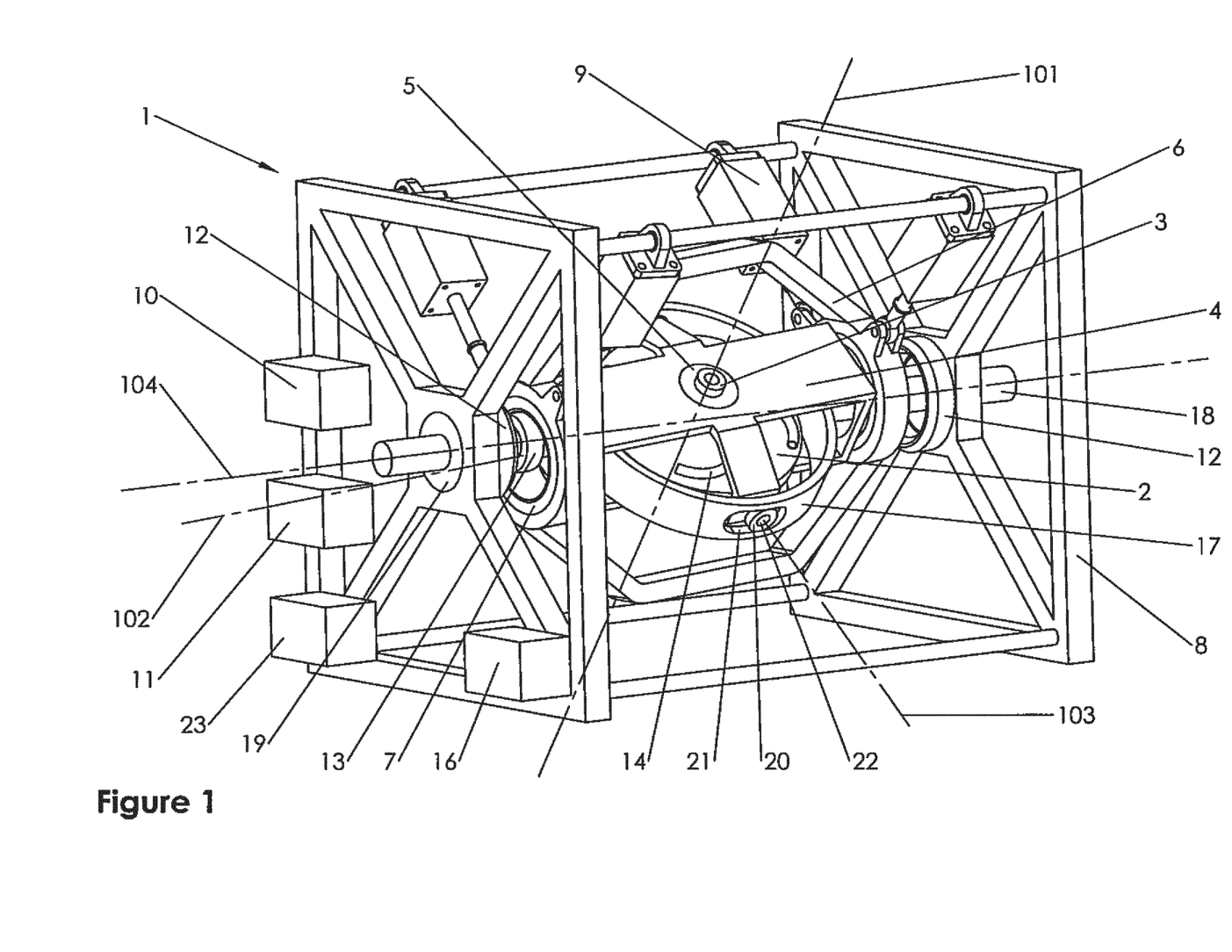
FIG. 1 is a schematic view of the braking device according to a first embodiment of the invention.

Referring to FIG. 1, a braking device 1 according to a first preferred embodiment of the invention comprises a body 2 in the form of a solid cylindrical wheel which is mounted coaxially on a rotation shaft 3 for rotation therewith about a first axis 101. The rotation shaft 3 is mounted within an inner cradle 4 by means of inner bearings 5. The inner cradle 4, in turn, is mounted for rotation about a second axis 102 within an outer cradle 6 by means of outer bearings 7. The outer cradle 6 is suspended within a frame 8 by means of a suspension system which comprises four pneumatic cylinders 9. The number of cylinders 9, the locations and the orientations of the cylinders 9 are determined such that (i) the outer cradle 6 is supported within the frame 8, (ii) the second axis 102 is allowed to rotate about the fourth axis 104, and (iii) the outer cradle 6 is not allowed to rotate about the second axis 102 (that is, any rotation of the outer cradle 6 about the second axis 102 prevented). The outer cradle 6 is preferably attached to the rod of each cylinder 9 by means of a spherical joint, and the barrel of each cylinder 9 is preferably attached to the frame 8 by means of a spherical joint. An example placement of the cylinders 9 is shown in FIG. 1. In another embodiment, the cylinders 9 may also be placed so as to support the outer cradle 6 from the bottom side. Furthermore, the cylinders 9 may also be placed so as to support the outer cradle 6 from both the top and the bottom sides. The orientations the cylinders 9 may also be reversed such that the rod of each cylinder 9 is attached to the frame 8 and the barrel of each cylinder 9 is attached to the outer cradle 6. The cylinders 9 may be single acting or double acting cylinders. Instead of the pneumatic cylinders 9, or in addition to the pneumatic cylinders 9, one or more air bellows (air springs) may also be used.

The type of the bearings in the braking device 1 may be fluid bearing type. The fluid may comprise liquid and/or gaseous fluids.

The braking device 1 is used to brake a rotation that is desired to be braked about a fourth axis 104. The fourth axis 104 may be in any desired orientation. The second axis 102 is oriented with respect to the fourth axis 104 at a beta angle β. The first axis 101 is oriented with respect to the second axis 102 at an alpha angle α. In order to obtain braking torque, the alpha angle α should be set to a value which is greater than 0 degrees, and the beta angle β should be set to a value which is greater than 0 degrees and less than 90 degrees. The alpha angle α is preferably set to 90 degrees.

In the braking device 1, the third axis 103 is defined as the precession axis about which the precession of the body 2 occurs as a result of rotating the body 2 about the first axis 101 and applying torque to the body 2 about the second axis 102. In other words, while the body 2 is being rotated about the first axis 101, if a torque is applied to the body 2 about the second axis 102, the body 2 starts precessing about the third axis 103, that is, the first axis 101 starts rotating about the third axis 103. The third axis 103 is perpendicular to both the first axis 101 and the second axis 102. The first axis 101, the second axis 102, and the third axis 103 substantially intersect at the centre of mass of the body 2. An example orientation of the axes can be seen in FIG. 2.

In the braking device 1, the pneumatic cylinders 9 are configured to function as springs by means of compression of air inside the cylinders 9. The piston area of each cylinder 9 should be determined so as to allow the cylinder 9 to carry the weight of the assembly (which comprises the outer cradle 6, the inner cradle 4 and the body 2) that the suspension system supports, and also so as to allow the rotation of the second axis 102 about the fourth axis 104 while the beta angle β is at a desired value.

The braking device 1 comprises a position control unit 10 for controlling the positions (stroke lengths) of the pistons of the cylinders 9 in the suspension system. Each cylinder 9 in the suspension system has a position sensor which measures the stroke length of the piston of the cylinder 9, and provides position feedback to the position control unit 10. Additionally, the braking device 1 also comprises an air compressor 11 with an air tank, and means (not shown) for conveying pressurised air to each cylinder 9. The means (not shown) for conveying pressurised air to the cylinders 9 may comprise one or more of: pipes; tubes, hoses, channels, rotary joints and valves. The power required for the air compressor 11 may be provided by an external power supply or by the rotation that is desired to be braked. The position control unit 10 may control the position of the piston of a cylinder 9 by means of supplying air to the cylinder 9 and/or discharging air from the cylinder 9 based on the position feedback. Depending on the configuration and the type of the cylinders 9 used in the suspension system, the upper chambers and/or the bottom chambers of the cylinders 9 may be used. Alternatively or additionally, the braking device 1 may comprise one or more pressure sensors for measuring the pressure values of the air inside the cylinders 9. The position control unit 10 may also use pressure feedback obtained from the cylinders 9. The position control unit 10 is also used to provide air to the cylinders 9 in case of a leakage.

During the operation of the braking device 1, the second axis 102 rotates about the fourth axis 104 causing the piston rods of the cylinders 9 to extend and retract. The position control unit 10 controls the position of each cylinder 9 so as to keep its position within a predetermined range. This range for each cylinder 9 is determined such that as the piston rods of the cylinders 9 moves back and forth within this range, the centre of mass of the body 2 is kept substantially on the fourth axis 104, and also the second axis 102 is allowed to rotate about the fourth axis 104 while the beta angle β is substantially at the desired value which is greater than 0 degrees and less than 90 degrees.

Depending on the configuration of the cylinders 9, the position control unit 10 may disable and enable a set of cylinders 9 during the operation of the braking device 1 in case the operating conditions of the braking device 1 change.

The braking device 1 comprises two elastic bumpers 12 which are fixed on the opposite sides of the frame 8 which are so configured as to limit the translational motion of the outer cradle 6 along the fourth axis 104. Thus, these bumpers 12 absorb the impact in case a collision occurs between the outer cradle 6 and the frame 8.

The strength of the body 2 and the density distribution of the body 2 may affect the magnitude of the braking torque. The form of the body 2 may be different than solid cylindrical wheel. The body 2 may comprise a hub, a web and a rim of ring shape. The form of the body 2 may be such that the moment of inertia of the body 2 about the first axis 101 per unit mass is higher than or equal to $(2/5)*R^2$ where R is radius of the minimal bounding sphere of the body 2. The minimal bounding sphere is defined as the smallest sphere which contains the body 2. The body 2 may also be made from a material with a modulus of elasticity exceeding 70 GPa. The first axis 101 may be oriented with respect to the body 2 such that the moment of inertia of the body 2 about the first axis 101 is substantially maximised.

Figure 3:
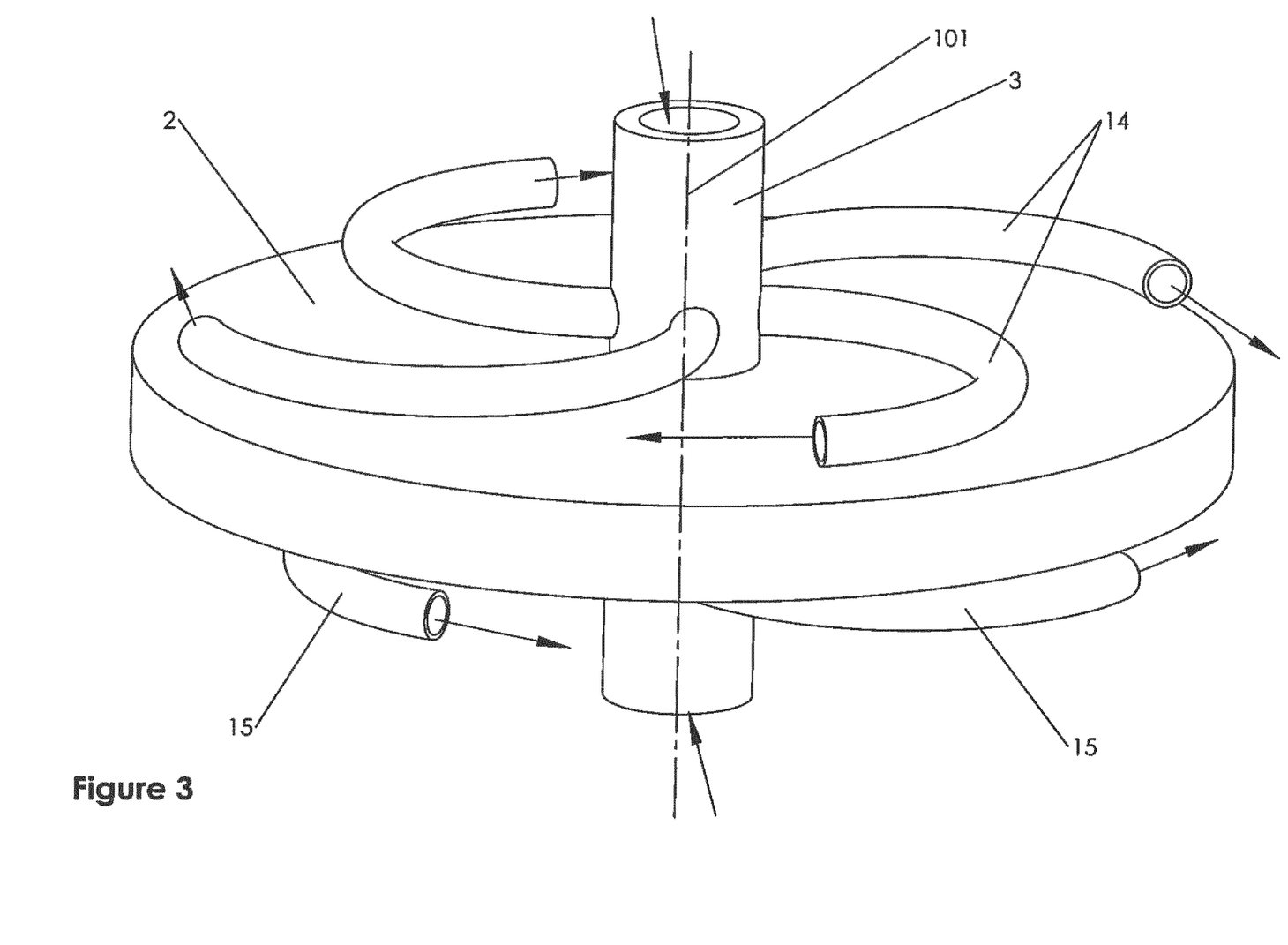
FIG. 3 illustrates an example placement of pipes on the rotation shaft of the body according to an embodiment of means for rotating the body about the first axis.

The body 2 is rotated about the first axis 101 by means of pressurised fluid. For this purpose, the body 2 comprises one or more fluid pipes 14 mounted on the rotation shaft 3 directed radially outward from the centre of the rotation shaft 3. In addition to this, the braking device 1 comprises a fluid pump 16, and means (not shown) for conveying pressurised fluid to the pipes mounted on the rotation shaft 3. There is a fluid channel located inside the rotation shaft 3. The fluid entering this channel is indicated by the axially arranged arrows as can be seen in FIG. 3. The means (not shown) for conveying pressurised fluid to the pipes 14 may comprise one or more of: pipes; tubes, hoses, channels and rotary joints. The power required for the fluid pump 16 may be provided by an external power supply or by the rotation that is desired to be braked. The nozzles of the pipes 14 are oriented such that as the pressurised fluid exits from the nozzles, the reaction of the fluid applies torque to the body 2 so as to rotate the body 2 about the first axis 101. For increasing the magnitude of the torque applied to the body 2 about the first axis 101, it is preferred that the nozzles are oriented in tangential direction to the body 2. The magnitude of the torque applied to the body 2 about the first axis 101 can be controlled by controlling the flow rate of the fluid.

The body 2 may comprise another set of fluid pipes 15, the nozzles of which are oriented so as to apply torque to the body 2 about the first axis 101 in the opposite direction. In this case, conveying fluid to this set of pipes 15 causes deceleration of the body 2 about the first axis 101. A valve may be provided in order to alternate the fluid between the first set of pipes 14 and the second set of pipes 15. An example placement of the first set of pipes 14 and the second set of pipes 15 can be seen in FIG. 3. The arrows in FIG. 3 indicate the flow direction of the fluid for this particular example. Instead of the first set of pipes 14 and the second set of pipes 15, similarly formed two sets of channels may also be provided inside the body 2.

Figure 4:
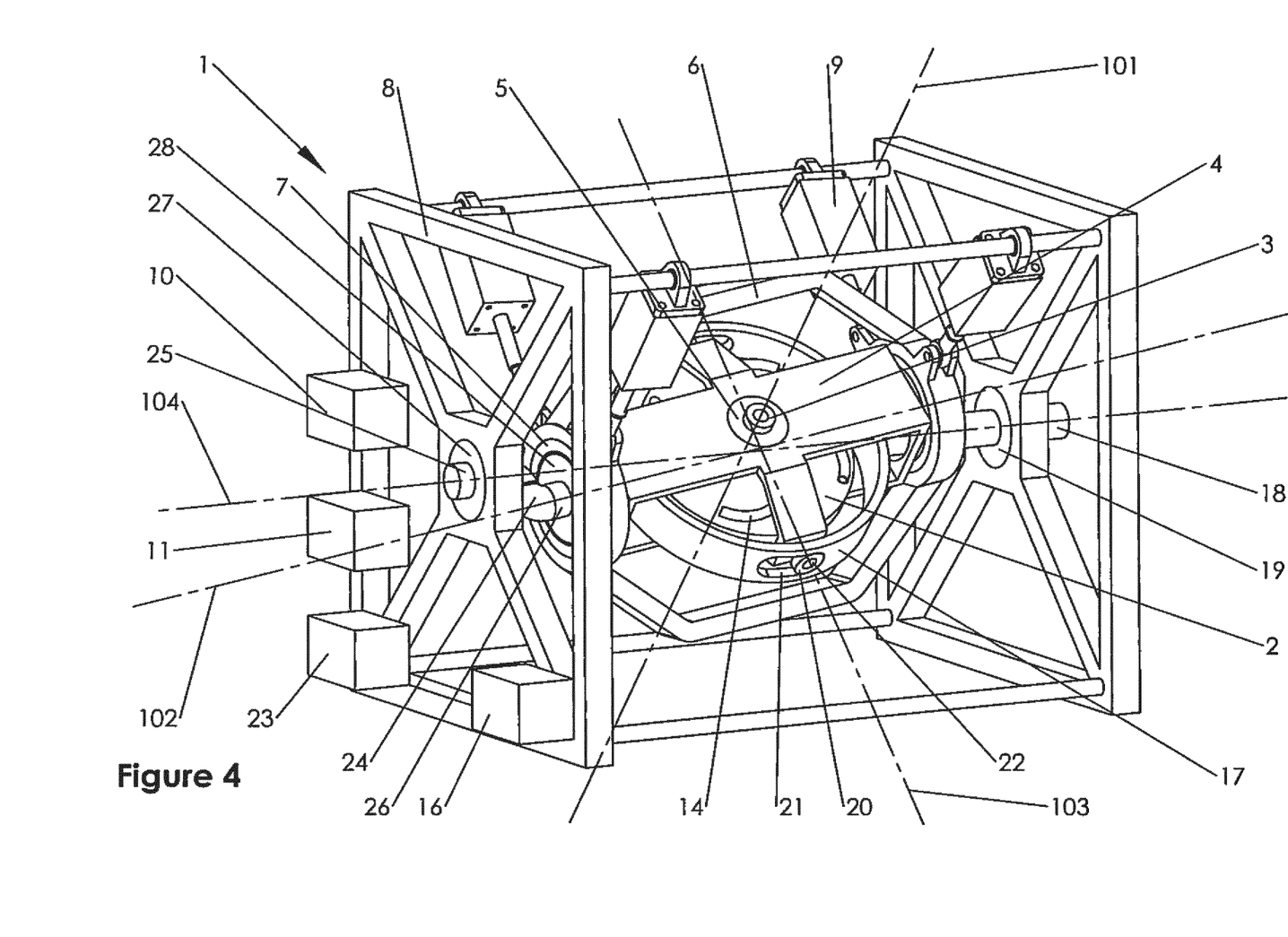
FIG. 4 shows an embodiment of means for limiting motion of the second axis.
Figure 5:
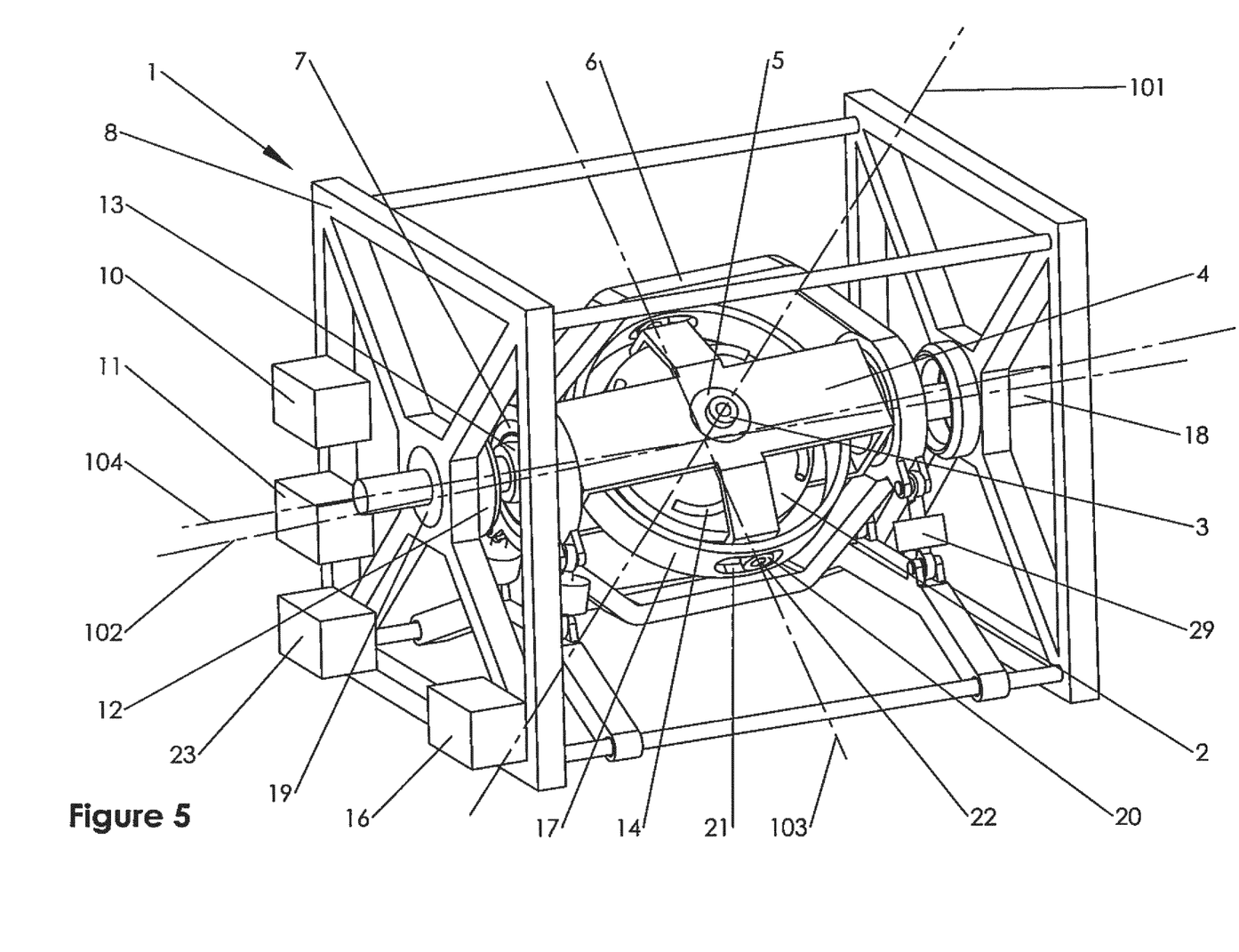
FIG. 5 shows an embodiment of suspension means for supporting the outer supporting means.

Referring to FIG. 1, FIG. 4 and FIG. 5 for example, the braking device 1 comprises rotary connection means 17 which is used for connecting the rotation that is desired to be braked about the fourth axis 104 to the body 2 so as to transmit rotation and torque to the body 2 about the second axis 102. The rotary connection means 17 is rigidly coupled to a shaft 18 which is mounted for rotation about the fourth axis 104 by means of rotary connection means bearings 19. The shaft 18 of the rotary connection means 17 along the fourth axis 104 is engaged to the rotation that is desired to be braked about the fourth axis 104. The rotary connection means 17 is in the form of a ring. On the rotary connection means 17, there are two symmetrical slots 21 with respect to the fourth axis 104. The inner cradle 4 comprises two pins 22 in the form of a solid sphere which are oriented along the third axis 103. Each of these two pins 22 is supported by a sliding part 20 for spherical motion. Each sliding part 20 is arranged to slide inside one of the slots 21 on the rotary connection means 17. This arrangement allows the rotation of the inner cradle 4 about the third axis 103 with respect to the rotary connection means 17. The orientations of the slots 21 are determined such that the inner cradle 4 is allowed to rotate in a limited manner about a fifth axis 105 with respect to the rotary connection means 17. The fifth axis 105 is defined as the axis which is perpendicular to both the third axis 103 and the fourth axis 104 and passes through the centre of mass of the body 2. The size and the locations of the slots 21 are also determined such that a full rotation of the second axis 102 about the fourth axis 104 is allowed while the rotary connection means 17 is kept stationary. It is preferred that the magnitudes of the frictional forces between the sliding parts 20 and the corresponding slots 21, and between the pins 22 and the corresponding sliding parts 20 are as small as possible. With this arrangement, if the body 2 is initially stationary, a rotation of the rotary connection means 17 causes the body 2 to rotate about the second axis 102.

Because of the production tolerances, there may be a difference in the magnitudes of the forces applied by the rotary connection means 17 to the inner cradle 4 through these two pins 22. In order to reduce this difference, the pins 22 may be mounted to the inner cradle 4 elastically so as to allow small movement of the pins 22 with respect to the inner cradle 4. This provides more balanced distribution of forces applied through these two pins 22, hence reducing the resultant force on the centre of the body 2.

While the braking device 1 is operating, the body 2 may further rotate in the direction of increasing the beta angle β. Referring to FIG. 1 and FIG. 5, the shaft 18 of the rotary connection means 17 passes through the two circular openings of the inner cradle 4. This configuration limits the motion of the outer cradle 6 (and also the motion of the second axis 102) about the fourth axis 104 such that the maximum value of the beta angle β is limited. In order to prevent direct contact between the inner cradle 4 and the shaft 18 of the rotary connection means 17, an elastic support 13 which is fixed to the shaft 18, is placed in between. The desired limit value of the beta angle β can be set by changing the diameter of the openings and/or the diameter of the shaft 18 of the rotary connection means 17 (including the thickness of the elastic support 13).

The braking device 1 may also comprise a clutch (not shown) for disengaging the rotation that is desired to be braked from the rotary connection means 17 when braking torque is not needed. Additionally, a transmission may be provided in order to change the ratio of the speed of the rotation that is desired to be braked to the speed of the rotation of the rotary connection means 17 about the fourth axis 104. In this case, the input shaft of the transmission is engaged to the rotation that is desired to be braked and the output shaft is engaged to the shaft 18 of the rotary connection means 17. Since the rotary connection means 17 connects the rotation that is desired to be braked about the fourth axis 104 to the body 2 so as to transmit rotation and torque to the body 2 about the second axis 102, the transmission also allows to change the speed of the rotation of the body 2 about the second axis 102 while the speed of the rotation that is desired to be braked is constant.

The braking device 1 preferably comprises sensors for measuring values of: the speed of the rotation of the body 2 about the first axis 101; the speed of the rotation of the rotary connection means 17; the beta angle β; the speed of the rotation that is desired to be braked. The braking device 1 may comprise one of more of the following sensors: hall-effect sensors, optical sensors, proximity sensors, flow sensors and torque sensors.

The braking device 1 comprises an automatic control unit 23 (as can be seen in FIG. 1, FIG. 4 and FIG. 5 for example) which is used to provide different operating conditions. Depending on the application area, the automatic control unit 23 gets different input signals from various sensors of the braking device 1 and sets the parameters of the device 1 such as the speed of the rotation of the body 2 about the first axis 101, the magnitude of the braking torque, and the ratio of the speed of the rotation that is desired to be braked to the speed of the rotation of the body 2 about the second axis 102. The automatic control unit 23 may also control the magnitude of the braking torque so as to keep the speed of the rotation that is desired to be braked substantially constant at a desired value (for instance, in order to keep the speed of a vehicle travelling downhill substantially constant at a desired value).

In order to control the magnitude of the braking torque, the automatic control unit 23 controls the speed of the rotation of the body 2 about the first axis 101 and/or the speed of the rotation of the body 2 about the second axis 102. The speed of the rotation of the body 2 about the second axis 102 may be controlled by changing the ratio of the speed of the rotation that is desired to be braked to the speed of the rotation of the rotary connection means 17 about the fourth axis 104, that is, by changing the speed ratio of the transmission.

The automatic control unit 23 may also control the braking device 1 so as to remove the braking torque on the rotation that is desired to be braked when braking torque is not needed. The braking torque may be removed using at least one of: (i) stopping the rotation of the body 2 about the first axis 101, and (ii) disengaging the rotation that is desired to be braked from the rotary connection means 17.

Note that the braking torque may not be totally removed by setting the beta angle β to 0 degrees or 90 degrees because of the possible vibrations and deformations occurred in the braking device 1 which are caused by the internal forces.

Figure 2:
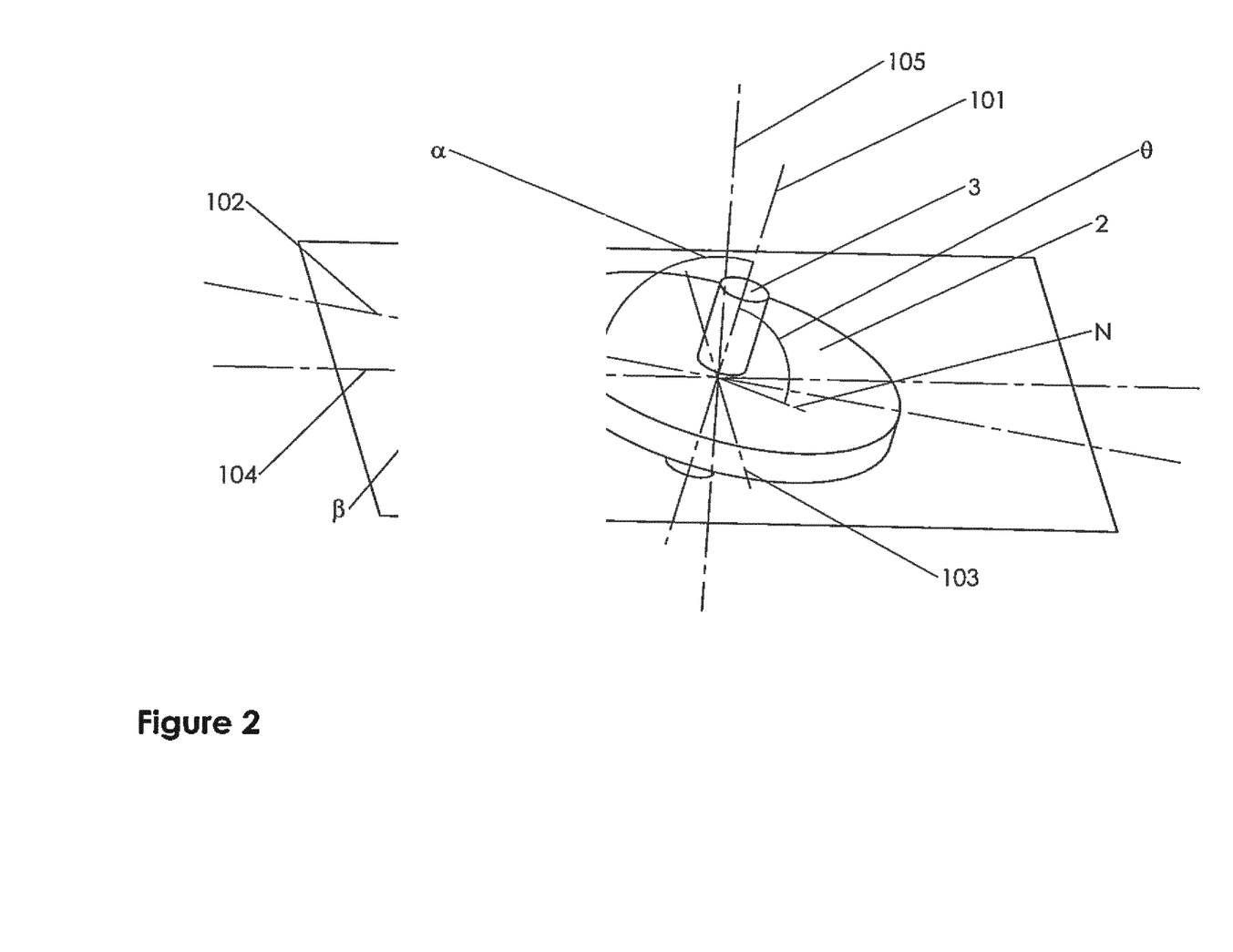
FIG. 2 is a diagram illustrating an example orientation of the first, second, third and fourth axes, the normal line of the plane which contains the second axis and the fourth axis, the alpha, the beta and the theta angles.

Before describing the operation of the braking device 1, a further angle definition will be introduced. The normal line of the plane which contains the second axis 102 and the fourth axis 104 is defined as the line which is orthogonal to this plane and passes through the centre of mass of the body 2. The theta angle θ is defined as the acute angle (or possibly the right angle) between the first axis 101 and the normal line N of the plane which contains the second axis 102 and the fourth axis 104.

In the operation of the braking device 1, the body 2 is first caused to rotate about the first axis 101 by means of conveying pressurised fluid obtained from the fluid pump 16 to the pipes on the rotational shaft of the body 2. When the rotation that is desired to be braked is engaged to the rotary connection means 17, the rotary connection means 17 connects the rotation that is desired to be braked to the body 2 so as to transmit rotation and torque to the body 2 about the second axis 102. Thus, through the rotary connection means 17, a torque is applied to the body 2 about the second axis 102 so as to rotate the body 2 about the second axis 102. At first, the torque applied to the body 2 about the second axis 102 causes the body 2 to rotate about the second axis 102 such that the theta angle θ becomes smaller than 90 degrees if it is not already so. In other words, the first axis 101 no more lies in the plane which contains the second axis 102 and the fourth axis 104. This enables the body 2 to have a limited freedom of rotation about the third axis 103 so that the body 2 is able to rotate about the third axis 103. As a result of (i) the rotation of the body 2 about the first axis 101, and (ii) the torque applied to the body 2 about the second axis 102, the body 2 starts rotating about the third axis 103. In the literature, this rotation is known as precession. Thus, the body 2 rotates about the first axis 101, the second axis 102 and the third axis 103 simultaneously. However, the rotation of the body 2 about the second axis 102 and the rotation of the body 2 about the third axis 103 are observed as if the body 2 rotates about the fourth axis 104. In other words, the body 2 is not rotated about the fourth axis 104; and the observed rotation of the body 2 about the fourth axis 104 is actually a result of the rotation of the body 2 about both the second axis 102 and the third axis 103. The rotation of the body 2 about the first axis 101 and the rotation of the body 2 about the third axis 103 together cause a braking torque to occur about the second axis 102. The braking torque about the second axis 102 is transmitted back to the rotation that is desired to be braked about the fourth axis 104 by means of the rotary connection means 17. During the operation of the braking device 1, the theta angle θ remains constant at a value less than 90 degrees as long as the parameters of the braking device 1 are kept constant. The value of the theta angle θ depends on the parameters of the braking device 1. Therefore, the braking device 1 provides continuous braking torque against the rotation that is desired to be braked about the fourth axis 104.

In a second preferred embodiment of the braking device, the suspension system is additionally configured to function as the means for limiting motion of the second axis 102. In this embodiment, the stiffness of the suspension system is determined or adjusted such that the beta angle β is limited at a desired value which is greater than 0 degrees and less than 90 degrees.

Referring to FIG. 4, another preferred embodiment of the means for limiting motion of the second axis 102 such that the beta angle β is limited at a desired value which is greater than 0 degrees and less than 90 degrees comprises an arm 24 which will be referred as the limiting arm 24. The limiting arm 24 comprises two rods which are rigidly coupled together such that the angle between the axis along which the first rod 25 is oriented and the axis along which the second rod 26 is oriented is at a desired value for the beta angle β. The limiting arm 24 is mounted to the braking device such that the first rod 25 lies along the fourth axis 104 and supported for rotation about the fourth axis 104 by means of the first limiting arm bearings 27 of the frame 8; and the second rod 26 lies along the second axis 102 and supported for rotation about the second axis 102 by means of the second limiting arm bearings 28 of the inner cradle 4. This arrangement ensures that the motion of the second axis 102 is limited so as to keep the beta angle β constant at a selected value while allowing the second axis 102 to rotate about the fourth axis 104.

Referring to FIG. 5, another preferred embodiment of the suspension means comprises four engine mounts 29 (may also be called motor mounts), one end of each of which is mounted to the bottom side of the outer cradle 6 by means of a spherical joint, and the other end of each of which is mounted to the frame 8 by means of another spherical joint. The number of engine mounts 29, the locations, the orientations and the types of the engine mounts 29 are determined such that (i) the outer cradle 6 is supported within the frame 8, (ii) the second axis 102 is allowed to rotate about the fourth axis 104, and (iii) the outer cradle 6 is not allowed to rotate about the second axis 102 (that is, any rotation of the outer cradle 6 about the second axis 102 prevented).

Figure 6:
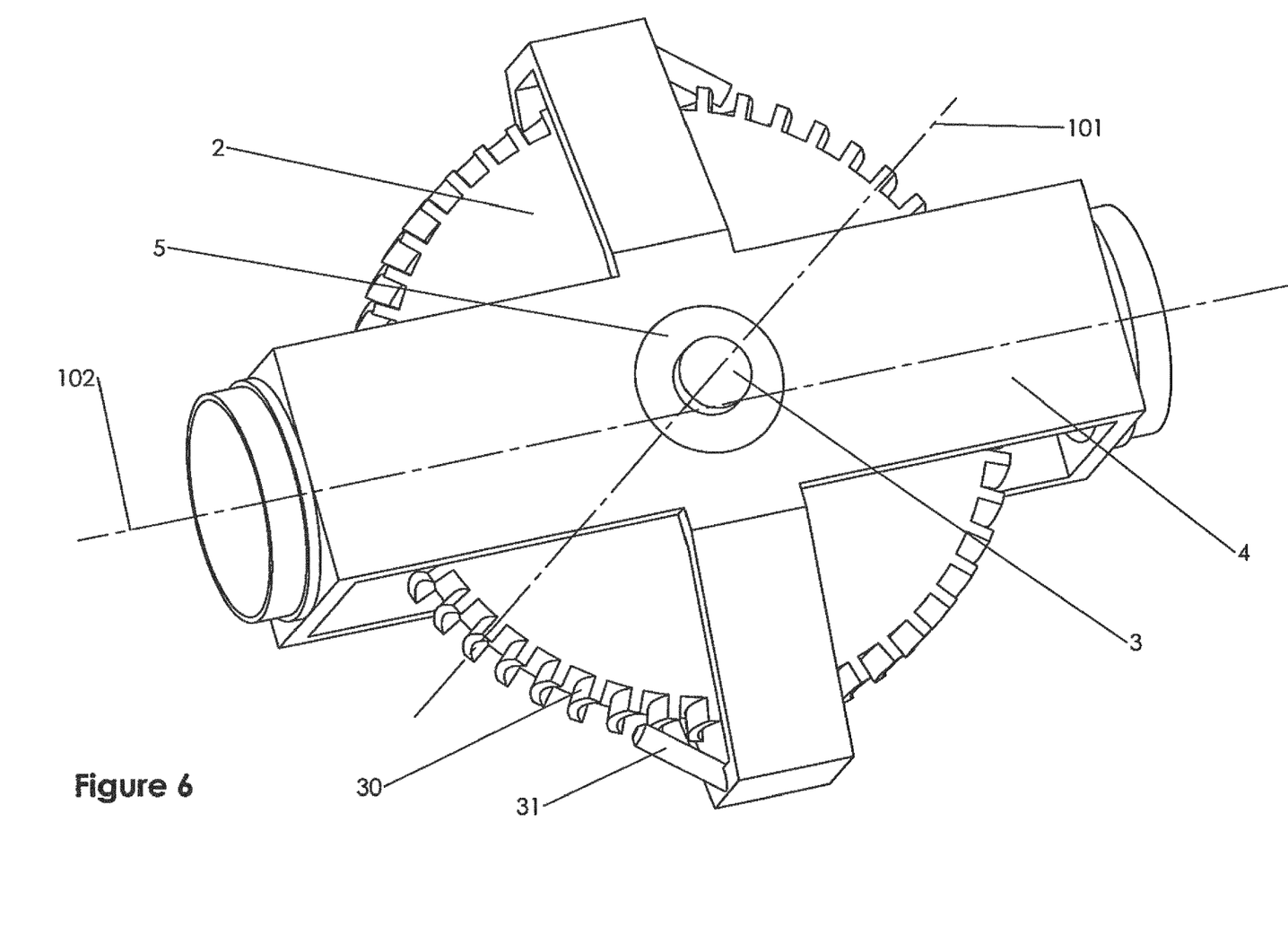
FIG. 6 illustrates an example placement of blades and nozzles according to an embodiment of means for rotating the body about the first axis.

Referring to FIG. 6, in another preferred embodiment of the means for rotating the body 2 about the first axis 101, the braking device 1 comprises a body 2 with one or more blades 30, a set of one or more nozzles 31 attached to the inner cradle 4, a fluid pump 16, and means (not shown) for conveying pressurised fluid to nozzles 31 attached to the inner cradle 4. The orientations of the nozzles 31 and the form of the blades 30 are determined such that when the pressurised fluid is projected on the blades 30 of the body 2, the fluid causes a torque to be applied to the body 2 about the first axis 101 so as to accelerate the body 2 about the first axis 101. The magnitude of the torque applied to the body 2 about the first axis 101 can be controlled by controlling the flow rate of the fluid. A second set of nozzles (not shown in FIG. 6) may also be provided so as to apply torque to the body 2 about the first axis 101 in the opposite direction, that is so as to decelerate the body 2 about the first axis 101. A valve may be provided in order to alternate the fluid between the first and the second set of nozzles.

In another preferred embodiment of the means for rotating the body 2 about the first axis 101, a source of motive power is provided so as to rotate the body 2 about the first axis 101. The source of motive power could be for instance an electrical motor or a hydraulic motor or a pneumatic motor. The power required for the source of motive power may be provided by an external power supply or by the rotation that is desired to be braked.

In a third, alternative embodiment, at least one of the first, second, third or fourth axes do not pass through the centre of mass of the body 2.

In a fourth, alternative embodiment, the frame 8 of the braking device 1 comprises the chassis of a vehicle.

In a fifth, alternative embodiment, the frame 8 of the braking device 1 is mounted to the chassis of a vehicle by means of engine mounts so as to reduce vibrations.

Figure 7:
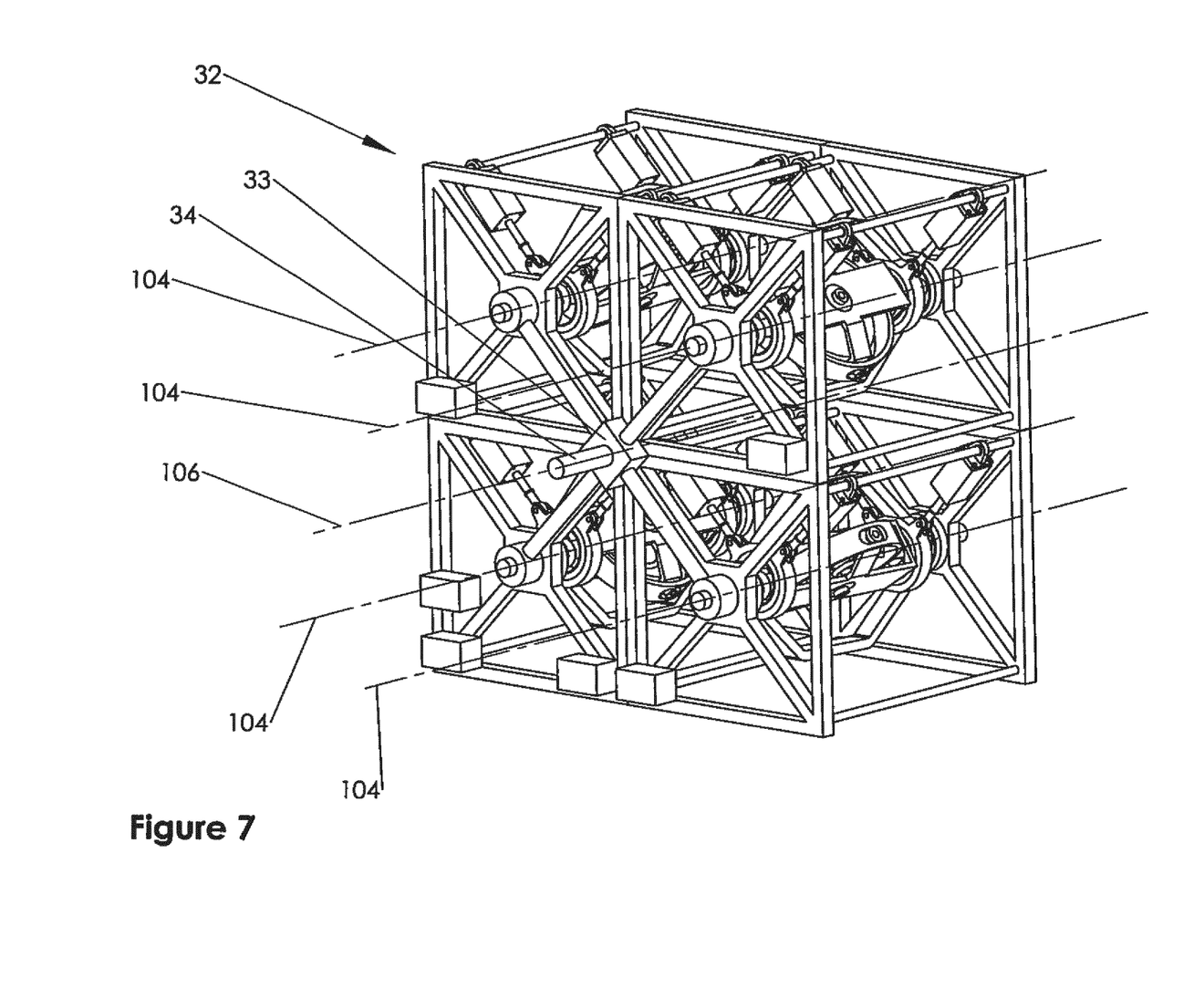
FIG. 7 shows an embodiment of an assembly of braking devices.
Figure 8:
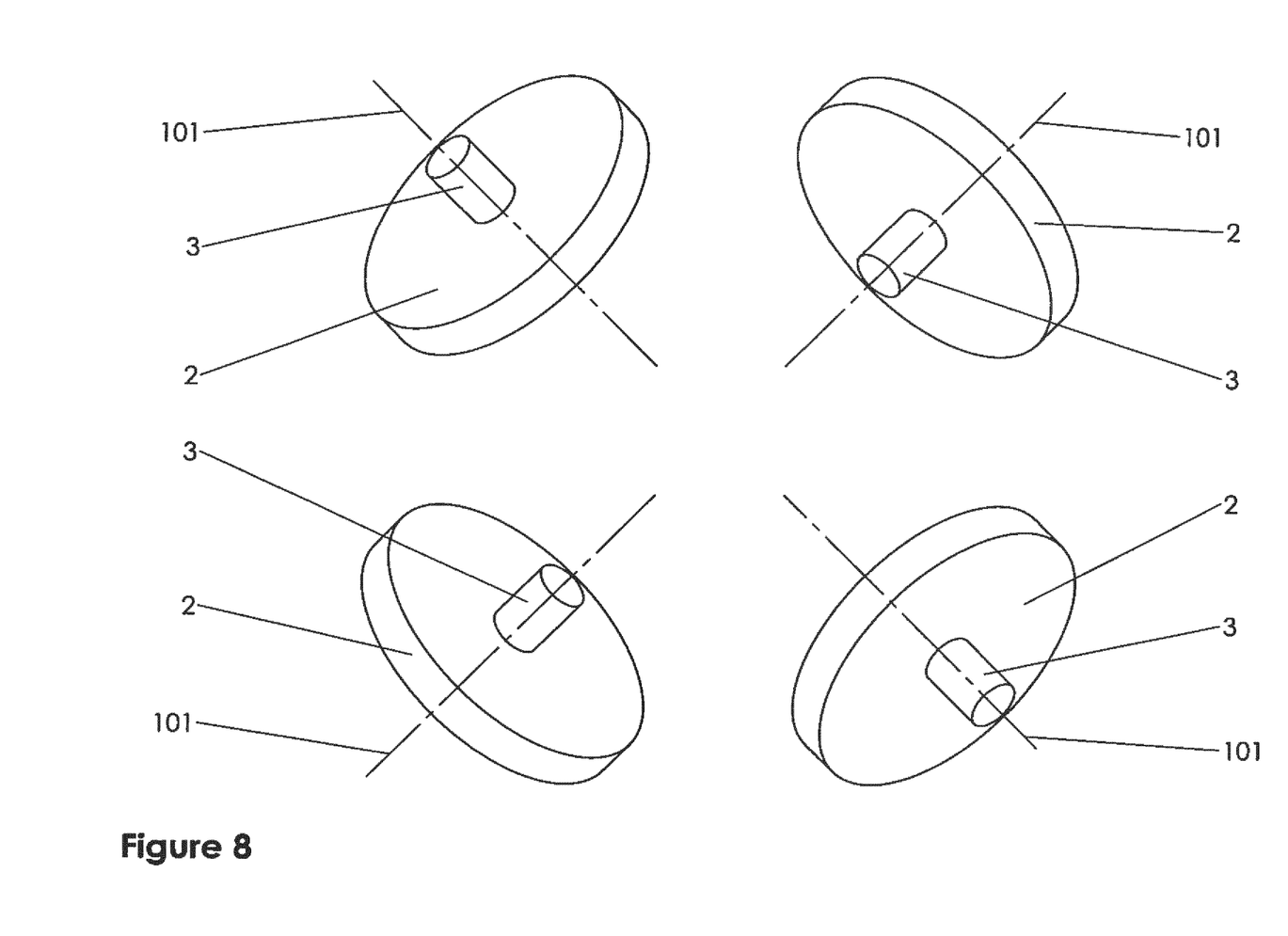
FIG. 8 is a diagram illustrating the relative orientations of the bodies in an embodiment of an assembly of braking devices at a specific instant.

Referring to FIG. 7, an embodiment of an assembly 32 of braking devices 1 is provided. The assembly 32 comprises four identical braking devices 1 arranged in a 2×2 array. The frames 8 of the braking devices 1 are rigidly coupled together such as the fourth axes 104 of the braking devices 1 are substantially parallel to each other. The assembly 32 further comprises a means 33 for distributing a rotation about a sixth axis 106 to each braking device 1 such that the shaft 34 of the means for distributing a rotation is engaged to the shaft 18 of the rotary connection means 17 of each braking device 1 so as to cause the rotary connection means 17 of each braking device 1 to rotate at the same rotational speed but at different respective phase angle. The sixth axis 106 could be any axis which is substantially parallel to the fourth axes 104 of the braking devices 1. The rotation that is desired to be braked is engaged to the shaft 34 of the means for distributing a rotation. The means 33 for distributing a rotation may comprise one or more chain-sprocket mechanisms, belt-pulley mechanisms or gear mechanisms. The phase angles in this embodiment are equally spaced in order to reduce the magnitude of the internal resultant torque. For instance, if the phase angle of the upper left braking device 1 is assumed to be 0 degrees, the phase angle of the lower left braking device 1 would be 90 degrees, the phase angle of the lower right braking device 1 would be 180 degrees, and the phase angle of the upper right braking device 1 would be 270 degrees. The relative orientations of the bodies 2 of the braking devices 1 at a specific instant are illustrated in FIG. 8. The means 33 for distributing a rotation ensures that the rotations of the rotary connection means 17 of braking devices 1 are synchronised so as to preserve the relative orientations of the bodies 2 of the braking devices 1. This arrangement reduces the vibrations occurred in the assembly 32. The magnitude of the braking torque provided by the assembly 32 is the sum of the braking torques provided by each of the braking devices 1 in the assembly 32.

KEY OF REFERENCE SIGNS

1. Braking device
2. Body
3. Rotation shaft
4. Inner cradle
5. Inner bearings
6. Outer cradle
7. Outer bearings
8. Frame
9. Cylinder
10. Position control unit
11. Air compressor
12. Elastic bumper
13. Elastic support
14. First set of fluid pipes
15. Second set of fluid pipes
16. Fluid pump
17. Rotary connection means
18. Shaft of the rotary connection means
19. Rotary connection means bearings
20. Sliding part
21. Slots of the rotary connection means
22. Spherical pins
23. Automatic control unit
24. Limiting arm
25. First rod of the limiting arm
26. Second rod of the limiting arm
27. First limiting arm bearings
28. Second limiting arm bearings
29. Engine mount
30. Blades of the body
31. Nozzles
32. Assembly of braking devices
33. Means for distributing a rotation
34. Shaft of the means for distributing a rotation
101. First axis
102. Second axis
103. Third axis
104. Fourth axis
105. Fifth axis
106. Sixth axis
α Alpha angle
β Beta angle
θ Theta angle
N Normal line of the plane which contains the second axis and the fourth axis

What is claimed is:
1. A braking device comprising:
a body;
inner supporting means for supporting the body for rotation about a first axis;
outer supporting means for supporting the inner supporting means for rotation about a second axis, wherein the first axis is oriented with respect to the second axis at an alpha angle (α) which is greater than 0 degrees;
means for rotating the body about the first axis;
means for connecting a rotation that is desired to be braked about a fourth axis to the body so as to transmit rotation and torque to the body about the second axis, wherein the second axis is oriented with respect to the fourth axis at a beta angle (β) which is greater than 0 degrees and less than 90 degrees;
characterised in that
the braking device further comprises
suspension means for supporting the outer supporting means, wherein the suspension means is so configured as to allow rotation of the second axis about the fourth axis, and the suspension means is so configured as to prevent rotation of the outer supporting means about the second axis;
whereby
the body is further allowed to rotate about a third axis which is a precession axis about which the precession of the body occurs as a result of rotating the body about the first axis and applying torque to the body about the second axis,
the rotation of the body about the first axis and the torque applied to the body about the second axis together cause the body to further rotate about the third axis,
the body rotates about the first axis, the second axis and the third axis simultaneously,
the rotation of the body about the first axis and the rotation of the body about the third axis together cause a braking torque to occur about the second axis;
thereby to obtain braking torque against the rotation that is desired to be braked about the fourth axis.

2. A braking device as claimed in claim 1, further comprising a frame wherein the suspension means is placed between the frame and the outer supporting means so as to support the outer supporting means such that rotation of the second axis about the fourth axis is allowed, and rotation of the outer supporting means about the second axis is prevented.

3. A braking device as claimed in claim 1, further comprising fluid bearing means so as to support one or more of: the body, the inner supporting means, and means for connecting a rotation that is desired to be braked about a fourth axis to the body so as to transmit rotation and torque to the body about the second axis.

4. A braking device as claimed in claim 1, wherein the suspension means comprises elastic mounting means.

5. A braking device as claimed in claim 1, wherein the suspension means comprises spring means.

6. A braking device as claimed in claim 5, wherein the spring means comprises one or more mechanical springs.

7. A braking device as claimed in claim 5, wherein the spring means comprises air spring means.

8. A braking device as claimed in claim 7, wherein the air spring means comprises one or more pneumatic cylinders which are configured to act as springs by means of compression of air inside the cylinders.

9. A braking device as claimed in claim 7, wherein the air spring means comprises one or more air bellows.

10. A braking device as claimed in claim 7, further comprising means for measuring the position of the air spring means.

11. A braking device as claimed in claim 7, further comprising means for controlling the position of the air spring means.

12. A braking device as claimed in claim 11, wherein the means for controlling the position of the air spring means is so configured as to keep the centre of mass of the body on the fourth axis.

13. A braking device as claimed in claim 1, wherein the suspension means is so configured as to allow rotation of the second axis about the fourth axis such that the beta angle (β) is limited at a desired value which is greater than 0 degrees and less than 90 degrees.

14. A braking device as claimed in claim 1, further comprising means for limiting motion of the second axis such that the beta angle (β) is limited at a desired value which is greater than 0 degrees and less than 90 degrees.

15. A braking device as claimed in claim 1, wherein the means for connecting a rotation that is desired to be braked about the fourth axis to the body so as to transmit rotation and torque to the body about the second axis is mounted for rotation about the fourth axis, the means for connecting a rotation that is desired to be braked about the fourth axis to the body so as to transmit rotation and torque to the body about the second axis is engaged to the rotation that is desired to be braked about the fourth axis, and the means for connecting a rotation that is desired to be braked about the fourth axis to the body so as to transmit rotation and torque to the body about the second axis is so structured as to apply torque to the body about the second axis when rotated about the fourth axis.

16. A braking device as claimed in claim 1, further comprising means for controlling the ratio of the speed of the rotation that is desired to be braked to the speed of the rotation of the body about the second axis.

17. A braking device as claimed in claim 16, wherein the means for controlling the ratio of the speed of the rotation that is desired to be braked to the speed of the rotation of the body about the second axis comprises transmission means such that the rotation that is desired to be braked is engaged to the input shaft of the transmission means, and the means for connecting a rotation that is desired to be braked about the fourth axis to the body so as to transmit rotation and torque to the body about the second axis is engaged to the output shaft of the transmission means.

18. A braking device as claimed in claim 1, wherein the means for rotating the body about the first axis comprises one or more of: an electrical motor; a hydraulic motor; and a pneumatic motor.

19. A braking device as claimed in claim 1, wherein the body comprises one or more blades.

20. A braking device as claimed in claim 19, wherein the means for rotating the body about the first axis comprises means for pumping fluid, and means for projecting fluid onto the blades of the body so as to rotate the body about the first axis.

21. A braking device as claimed in claim 1, wherein the body comprises one or more fluid pipes or channels.

22. A braking device as claimed in claim 21, wherein the means for rotating the body about the first axis comprises means for pumping fluid into one or more fluid pipes or channels of the body such that as the fluid exits from nozzles of the pipes or channels, the body is rotated about the first axis as a result of the reaction of the fluid.

23. A braking device as claimed in claim 1, wherein the power required for the means for rotating the body about the first axis is provided by the rotation that is desired to be braked.

24. A braking device as claimed in claim 1, further comprising means for controlling the means for rotating the body about the first axis so as to control the speed of the rotation of the body about the first axis.

25. A braking device as claimed in claim 1, further comprising one or more sensors for measuring values of one or more of the following parameters: the speed of the rotation of the body about the first axis; the speed of the rotation of the means for connecting a rotation that is desired to be braked about the fourth axis to the body so as to transmit rotation and torque to the body about the second axis; the beta angle (β); the magnitude of the braking torque; the speed of the rotation that is desired to be braked.

26. A braking device as claimed in claim 1, further comprising means for controlling the magnitude of the braking torque wherein the means for controlling the magnitude of the braking torque controls the magnitude of the braking torque by controlling one or more of: the speed of the rotation of the body about the first axis; and the ratio of the speed of the rotation that is desired to be braked to the speed of the rotation of the body about the second axis.

27. A braking device as claimed in claim 1, wherein each of the first axis, the second axis and the third axis are perpendicular to the other two axes.

28. A braking device as claimed in claim 1, wherein the moment of inertia of the body about the first axis per unit mass is higher than or equal to $(2/5)* R^2$ where R is radius of the minimal bounding sphere of the body, that is, the smallest sphere containing the body.

29. A braking device as claimed in claim 1, wherein the braking device provides a continuous braking torque against the rotation that is desired to be braked about the fourth axis.

30. A method of generating braking torque in a braking device comprising:
  a body;
  inner supporting means for supporting the body for rotation about a first axis;
  outer supporting means for supporting the inner supporting means for rotation about a second axis, wherein the first axis is oriented with respect to the second axis at an alpha angle (α) which is greater than 0 degrees;
  means for rotating the body about the first axis;
  means for connecting a rotation that is desired to be braked about a fourth axis to the body so as to transmit rotation and torque to the body about the second axis, wherein the second axis is oriented with respect to the fourth axis at a beta angle (β) which is greater than 0 degrees and less than 90 degrees;
  suspension means for supporting the outer supporting means;
  the method is characterised by:
  a step of configuring the suspension means so as to allow rotation of the second axis about the fourth axis;
  a step of configuring the suspension means so as to prevent rotation of the outer supporting means about the second axis;
  whereby
  the body is further allowed to rotate about a third axis which is a precession axis about which the precession of the body occurs as a result of rotating the body about the first axis and applying torque to the body about the second axis,
  the rotation of the body about the first axis and the torque applied to the body about the second axis together cause the body to further rotate about the third axis,
  the body rotates about the first axis, the second axis and the third axis simultaneously, however, the rotation of the body about the second axis and the rotation of the body about the third axis are observed as if the body rotates about the fourth axis, the rotation of the body about the first axis and the rotation of the body about the third axis together cause a braking torque to occur about the second axis;

thereby to obtain braking torque against the rotation that is desired to be braked about the fourth axis.

31. A method as claimed in claim 30, further comprising a step of adjusting the magnitude of the braking torque.

32. A method as claimed in claim 31, wherein the step of adjusting the magnitude of the braking torque comprises adjusting one or more of: the speed of the rotation of the body about the first axis; and the ratio of the speed of the rotation that is desired to be braked to the speed of the rotation of the body about the second axis.

33. A method as claimed in claim 30, further comprising a step of removing the braking torque when the braking torque is not needed.

34. A method as claimed in claim 33, wherein the step of removing the braking torque comprises one or more of stopping the rotation of the body about the first axis, disconnecting the rotation that is desired to be braked about the fourth axis from the body, and adjusting the alpha angle ($\alpha$) and/or the beta angle ($\beta$) to 0 degrees.

35. A method as claimed in claim 30, wherein a continuous braking torque is provided against the rotation that is desired to be braked about the fourth axis.

36. A method as claimed in claim 30, further comprising a step of measuring the position of the suspension means.

37. A method as claimed in claim 30, further comprising a step of controlling the position of the suspension means so as to keep the centre of mass of the body on the fourth axis.

38. A method as claimed in claim 30, further comprising a step of controlling the position of the suspension means so as to limit motion of the second axis such that the beta angle ($\beta$) is limited at a desired value which is greater than 0 degrees and less than 90 degrees.

* * * * *